United States Patent
Fu et al.

(10) Patent No.: US 11,990,835 B2
(45) Date of Patent: May 21, 2024

(54) POWER CONVERSION SYSTEM AND CONTROL METHOD

(71) Applicant: Huawei Digital Power Technologies Co., Ltd., Shenzhen (CN)

(72) Inventors: Dianbo Fu, Frisco, TX (US); Heping Dai, Plano, TX (US)

(73) Assignee: HUAWEI DIGITAL POWER TECHNOLOGIES CO., LTD., Shenzhen (CN)

(*) Notice: Subject to any disclaimer, the term of this patent is extended or adjusted under 35 U.S.C. 154(b) by 296 days.

(21) Appl. No.: 17/473,202

(22) Filed: Sep. 13, 2021

(65) Prior Publication Data

US 2021/0408915 A1 Dec. 30, 2021

Related U.S. Application Data

(63) Continuation of application No. PCT/US2019/039868, filed on Jun. 28, 2019.

(51) Int. Cl.
*H02M 7/08* (2006.01)
*H02M 1/42* (2007.01)
(Continued)

(52) U.S. Cl.
CPC ....... *H02M 1/4216* (2013.01); *H02M 1/4208* (2013.01); *H02M 1/44* (2013.01);
(Continued)

(58) Field of Classification Search
CPC .... H02M 1/42; H02M 1/4208; H02M 1/4216; H02M 1/44; H02M 3/335; H02M 7/06;
(Continued)

(56) References Cited

U.S. PATENT DOCUMENTS 5,847,949 A * 12/1998 Jiang ................. H02M 3/33561
363/39
10,811,975 B1 * 10/2020 Bala ...................... H02M 3/155
(Continued)

FOREIGN PATENT DOCUMENTS

CN 104094514 A 10/2014
DE 102004052700 A1 5/2006
(Continued)

OTHER PUBLICATIONS

Ghanshyamsinh Gohil et al., "Optimized Integrated Harmonic Filter Inductor for Dual-Converter-Fed Open-End Transformer Topology," IEEE Transactions on Power Electronics, vol. 32, No. 3, Mar. 2017, pp. 1818-1831.
(Continued)

*Primary Examiner* — Gary L Laxton
(74) *Attorney, Agent, or Firm* — Slater Matsil, LLP

(57) ABSTRACT

A power conversion system includes a first rectifier and a second rectifier. The first rectifier is configured to operate at a first operating frequency. The first rectifier is configured to be connected with a three-phase power source. A first amount of power flows through the first rectifier from the three-phase power source. The second rectifier is configured to operate at a second operating frequency. The second rectifier is configured to be connected in parallel with the first rectifier, and a second amount of power flows through the second rectifier from the three-phase power source. The second operating frequency is higher than the first operating frequency, and the second amount of power is a fraction of the first amount of power.

20 Claims, 12 Drawing Sheets

(51) Int. Cl.
*H02M 1/44* (2007.01)
*H02M 3/335* (2006.01)
*H02M 7/06* (2006.01)
*H02M 3/00* (2006.01)

(52) U.S. Cl.
CPC ............ *H02M 3/335* (2013.01); *H02M 7/06* (2013.01); *H02M 3/01* (2021.05); *H02M 3/33573* (2021.05)

(58) Field of Classification Search
CPC .. H02M 3/33573; H02M 3/01; H02M 1/0067; H02M 1/007
See application file for complete search history.

(56) References Cited

U.S. PATENT DOCUMENTS

2017/0063251 A1  3/2017  Ye et al.
2017/0302165 A1  10/2017  Marcinkiewicz et al.

FOREIGN PATENT DOCUMENTS

| | | |
|---|---|---|
| GB | 2460254 A | 11/2009 |
| JP | 2009142002 A | 6/2009 |
| WO | 2015074965 A1 | 5/2015 |
| WO | 2017076364 A1 | 5/2017 |
| WO | 2018072016 A1 | 4/2018 |

OTHER PUBLICATIONS

Haryani, N., et al., "A Novel ZVS Turn-on Triangular Current Mode Control with Phase Synchronization for Three Level Inverters", 2018 IEEE Energy Conversion Congress and Exposition (ECCE), Sep. 23-27, 2018, 8 Pages.

Leibl, M., et al., "New Boundary Mode Sinusoidal Input Current Control of the VIENNA Rectifier", 2015 IEEE Energy Conversion Congress and Exposition (ECCE), Sep. 20-24, 2015, 9 Pages.

C. Marxgut et al., "Interleaved Triangular Current Mode (TCM) Resonant Transition, Single Phase PFC Rectifier with High Efficiency and High Power Denisty" The 2010 International Power Electronics Conference, pp. 1725-1732.

D. Vinnikov et al., "Wide Input Voltage Range High Step-Up DC-DC Converter with Fault-Tolerant Operation Capability" IEEE International Conference on Industrial Technology (ICIT), Feb. 13, 2019, pp. 1099-1104.

T. B. Soeiro et al., "Comparison of Electrostatic Precipitator Power Supplies with Low Effects on the Mains" 8th International Conference on Power Electronics—ECCE Asia, May 30-Jun. 3, 2011, pp. 2382-2389.

Font, C.H.I. et al. "A New High Power Factor Bidirectional Hybrid Three-Phase Rectifier" Twenty-First Annual IEEE Applied Power Electronics Conference and Exposition, 2006, APEC, 7 pages.

* cited by examiner

POWER CONVERSION SYSTEM AND CONTROL METHOD

CROSS-REFERENCE TO RELATED APPLICATIONS

This application is a continuation of Application No. PCT/US2019/039868, filed on Jun. 28, 2019, which application is hereby incorporated herein by reference in its entirety.

TECHNICAL FIELD

The present disclosure relates to a high-efficiency power conversion system, and, in particular embodiments, to a high-efficiency power conversion system connected between a three-phase AC power source and a load such as a battery pack.

BACKGROUND

The power electronics industry has experienced a rapid growth due to the continuous improvements in the exponential development of new technologies. As the power electronics technologies further advances, on-board battery chargers have become a key element for some new energy applications. One of the most important new energy applications is electric vehicles (EV). Different EVs are equipped with different capacity and voltage batteries. The EVs need suitable chargers for charging a variety of batteries.

An on-board battery charger comprises electrical circuits for converting alternating current (AC) power into direct current (DC) power. The on-board battery charger may include an AC/DC stage and a DC/DC stage. The inputs of the AC/DC stage are connected to the AC utility line. The AC/DC stage is employed to convert the AC input voltage from the AC utility line to a suitable DC bus voltage. The AC/DC stage may comprise a variety of electromagnetic interference (EMI) filters, a bridge rectifier formed by four diodes and a power factor correction circuit.

The EMI filter is employed to reduce high frequency noise that may cause interference with other devices of the on-board battery charger. As a result of employing the EMI filters, the on-board battery charger may meet various EMI regulations. The bridge rectifier converts an AC voltage into a full-wave rectified DC voltage. Such a full-wave rectified DC voltage provides a DC input voltage for the power factor correction circuit. The power factor correction circuit may be implemented in a suitable power converter such as a boost converter. By employing an appropriate control circuit, the boost converter is capable of shaping the input line current to be sinusoidal and in phase with the sinusoidal input voltage of the AC input source. As a result, the power factor of the AC/DC stage may be close to unity as required by a variety of international standards.

The DC/DC stage is connected between the outputs of the AC/DC stage and a plurality of batteries. The DC/DC stage may comprise an isolated DC/DC power converter having one primary winding, a secondary winding and a secondary rectifier for converting the DC bus voltage into a DC voltage for charging the EV battery.

SUMMARY

These problems are generally solved or circumvented and the technical advantages are generally achieved by preferred embodiments of the present disclosure which provide a power conversion system and method for power transferring between an AC power source and a battery.

In accordance with an embodiment, a power conversion system comprises a first rectifier coupled to a three-phase power source and is configured to operate at a first operating frequency, a first amount of power flowing through the first rectifier from the three-phase power source, a second rectifier coupled to the three-phase power source and configured to operate at a second operating frequency that is higher than the first operating frequency, a second amount of power flowing through the second rectifier from the three-phase power source, the second amount of power being a fraction of the first amount of power.

The first rectifier is a three-phase diode rectifier. The second rectifier is a three-phase power factor correction converter. The three-phase power factor correction converter is a triangular current mode power factor correction converter comprising a first inductor connected between a first phase of the three-phase power source and a first switch leg, a second inductor connected between a second phase of the three-phase power source and a second switch leg and a third inductor connected between a third phase of the three-phase power source and a third switch leg, and wherein the first switch leg, the second switch leg and the third switch leg are connected between a first output terminal of the three-phase diode rectifier and a second output terminal of the three-phase diode rectifier. The first inductor, the second inductor and the third inductor are magnetically coupled to each other.

The power conversion system further comprises an isolated power converter connected to output terminals of the three-phase diode rectifier. The isolated power converter comprises a primary network, a transformer and a secondary network. The primary network is a full-bridge inductor-inductor-capacitor (LLC) converter.

In some embodiments, the secondary network comprises a first diode and a second diode connected in series with one another, a common node of the first diode and the second diode connected to a first terminal of a secondary winding of the transformer, and a third diode and a fifth switch connected in series with one another, a common node of the third diode and the fifth switch connected to a second terminal of the secondary winding of the transformer through a secondary capacitor, wherein the secondary network is configured as a voltage doubler through fixing the fifth switch in an always-on state.

In alternative embodiments, the secondary network comprises a first switch and a second switch connected in series with one another, a common node of the first switch and the second switch connected to a first terminal of a secondary winding of the transformer, and a third switch and a fourth switch connected in series with one another, a common node of the third switch and the fourth switch connected to a second terminal of the secondary winding of the transformer through a secondary capacitor, wherein the secondary network is configured as a voltage doubler through fixing the fourth switch in an always-on state.

In alternative embodiments, the secondary network comprises a first secondary rectifier and a second secondary rectifier. The first secondary rectifier comprises a first diode and a second diode connected in series with one another, a common node of the first diode and the second diode connected to a first terminal of a first secondary winding of the transformer, and a third diode and a fifth switch connected in series with one another, a common node of the third diode and the fifth switch connected to a second terminal of the first secondary winding of the transformer through a first secondary capacitor. The second secondary rectifier comprises a first switch and a second switch connected in series with one another, a common node of the first switch and the second switch connected to a first terminal of a second secondary winding of the transformer, and a third switch and a fourth switch connected in series with one another, a common node of the third switch and the fourth switch connected to a second terminal of the second secondary winding of the transformer through a second secondary capacitor. The first secondary rectifier and the second secondary rectifier are configured as a first voltage doubler and a second voltage doubler, respectively through fixing both of the fourth switch and the fifth switch in an always-on state.

In accordance with another embodiment, a method comprises transferring a first amount of power from an alternating current (AC) power source to a direct current (DC) load through a first power conversion device configured to operate at a first operating frequency, and transferring a second amount of power from the AC power source to the DC load through a second power conversion device configured to operate at a second operating frequency that is higher than the first operating frequency, the second amount of power being a fraction of the first amount of power.

The method further comprises detecting an input voltage applied to an isolated power converter connected to outputs of the first power conversion device and the second power conversion device and configuring a switch of a secondary rectifier of the isolated power converter as an always-on switch to configure the secondary rectifier as a voltage doubler if the input voltage applied to the isolated power converter is below a predetermined threshold.

The method further comprises configuring the second power conversion device to operate in a triangular current mode to achieve a unity power factor. The first power conversion device is a three-phase diode rectifier. The second power conversion device is a three-phase power factor correction device.

In accordance with yet another embodiment, a power conversion system comprises a first power conversion device connected between a three-phase power source and a DC voltage bus and configured to operate at a first operating frequency, a first amount of power flowing from the three-phase power source to the DC voltage bus through the first power conversion device, a second power conversion device connected between the three-phase power source and the DC voltage bus and configured to operate at a second operating frequency that is higher than the first operating frequency, a second amount of power flowing from the three-phase power source to the DC voltage bus through the second power conversion device, the second amount of power being a fraction of the first amount of power, and an isolated power converter connected to the DC voltage bus.

The first power conversion device is a three-phase diode rectifier. The second power conversion device is a three-phase power factor correction converter. The isolated power converter is an inductor-inductor-capacitor (LLC) power converter comprising a primary network, a transformer, and a secondary network connected in cascade with one another.

An advantage of an embodiment of the present disclosure is achieving a high-efficiency power conversion system between an AC power source and a DC load such as an EV battery.

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

For a more complete understanding of the present disclosure, and the advantages thereof, reference is now made to the following descriptions taken in conjunction with the accompanying drawings, in which:

FIG. 6 illustrates a schematic diagram of a first implementation of the isolated power conversion apparatus in accordance with various embodiments of the present disclosure;

FIG. 7 illustrates a schematic diagram of a second implementation of the isolated power conversion apparatus in accordance with various embodiments of the present disclosure;

FIG. 8 illustrates a schematic diagram of a third implementation of the isolated power conversion apparatus in accordance with various embodiments of the present disclosure.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present disclosure provides many applicable inventive concepts that can be embodied in a wide variety of specific contexts. The specific embodiments discussed are merely illustrative of specific ways to make and use the disclosure, and do not limit the scope of the disclosure.

The present disclosure will be described with respect to preferred embodiments in a specific context, namely a power conversion system for charging a batter of an electric vehicle. The present disclosure may also be applied, however, to a variety of power conversion systems. Hereinafter, various embodiments will be explained in detail with reference to the accompanying drawings.

Figure 1:
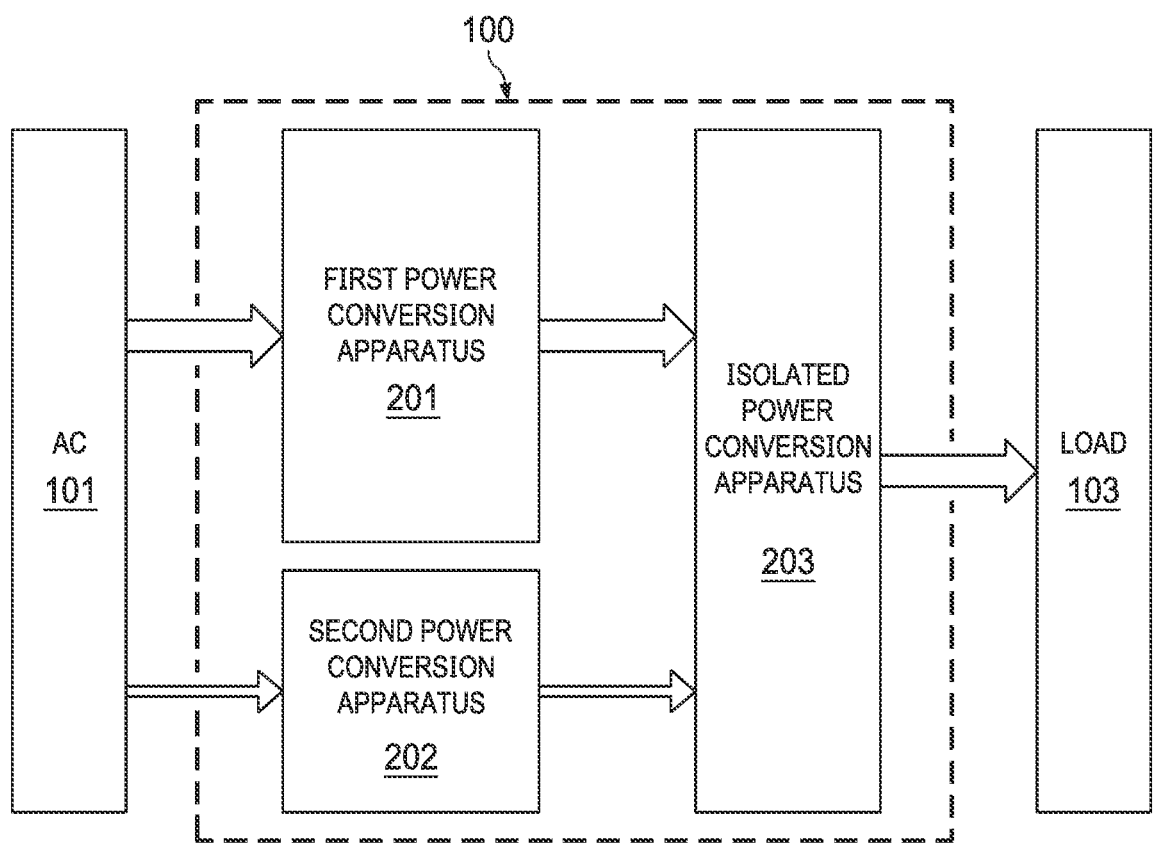
FIG. 1 illustrates a power conversion system in accordance with various embodiments of the present disclosure.

FIG. 1 illustrates a power conversion system in accordance with various embodiments of the present disclosure. The power conversion system 100 is connected between an AC element 101 and a DC element 103. Depending on different applications and design needs, the AC element 101 can be implemented as either a three-phase AC power source or a single-phase AC power source. Likewise, the DC element 103 can be implemented as either a single battery or a plurality of batteries connected in series and/or parallel.

In some embodiments, the power conversion system 100 is configured to convert AC power into DC power. The AC element 101 is implemented as an AC power source from a utility grid. More particularly, the AC element 101 may be implemented as a three-phase AC power source. The DC element 103 may be a semiconductor chip, a battery, a downstream power converter and the like. In some embodiments, the DC element 103 may be a battery pack of an electric vehicle. The power conversion system 100 shown in FIG. 1 may function as an electric vehicle charging converter.

Throughout the description, the AC element 101 is alternatively referred to the three-phase AC source. The DC element 103 is alternatively referred to the DC load.

As shown in FIG. 1, the power conversion system 100 comprises a first power conversion apparatus 201, a second power conversion apparatus 202 and an isolated power conversion apparatus 203. Throughout the description, the first power conversion apparatus 201 may be alternatively referred to as a first power conversion device. Likewise, the second power conversion apparatus 202 may be alternatively referred to as a second power conversion device. In some embodiments, the first power conversion apparatus 201 and the second power conversion apparatus 202 are connected in parallel between the three-phase AC power source 101 and the isolated power conversion apparatus 203. In some embodiments, the first power conversion apparatus 201 is an uncontrolled power conversion apparatus. The second power conversion apparatus 202 is configured to operate in a triangular current mode (TCM) to achieve a unity power factor for the power conversion system 100. In some embodiments, the first power conversion apparatus 201 is implemented as a three-phase diode rectifier. The second power conversion apparatus 202 is implemented as a three-phase power factor correction device. The power factor correction device is configured such that the power factor of the power conversion system 100 is adjusted to a level approximately equal to unity through adjusting input currents flowing into the power factor correction device.

In some embodiments, the isolated power conversion apparatus 203 is an inductor-inductor-capacitor (LLC) converter comprising a primary switching network and a secondary switching network magnetically coupled to the primary switching network. The primary switching network is the primary side of the LLC converter. The secondary switching network of the LLC converter is configured as a secondary rectifier.

In some embodiments, the LLC converter is able to operate at a switching frequency substantially equal to the resonant frequency of the LLC converter. As a result of having an LLC power converter operating at a switching frequency substantially equal to the resonant frequency, the power conversion system 100 is a high efficiency power conversion system.

In operation, in order to achieve high efficiency and a unity power factor, the power from the three-phase AC power source 101 to the DC load 103 is delivered through two routes, namely a first route comprising the diode rectifier and a second route comprising the power factor correction device. In some embodiments, the power flowing from the three-phase AC power source 101 to the DC load 103 through the power factor correction device is a fraction of the power from the three-phase AC power source 101 to the DC load 103 through the diode rectifier. For example, only about 15% of the total power passes through the power factor correction device. The majority of the total power (85%) passes through the diode rectifier. Such an uneven power distribution between two different power delivery routes helps to improve the efficiency of the power conversion system 100.

Figure 2:
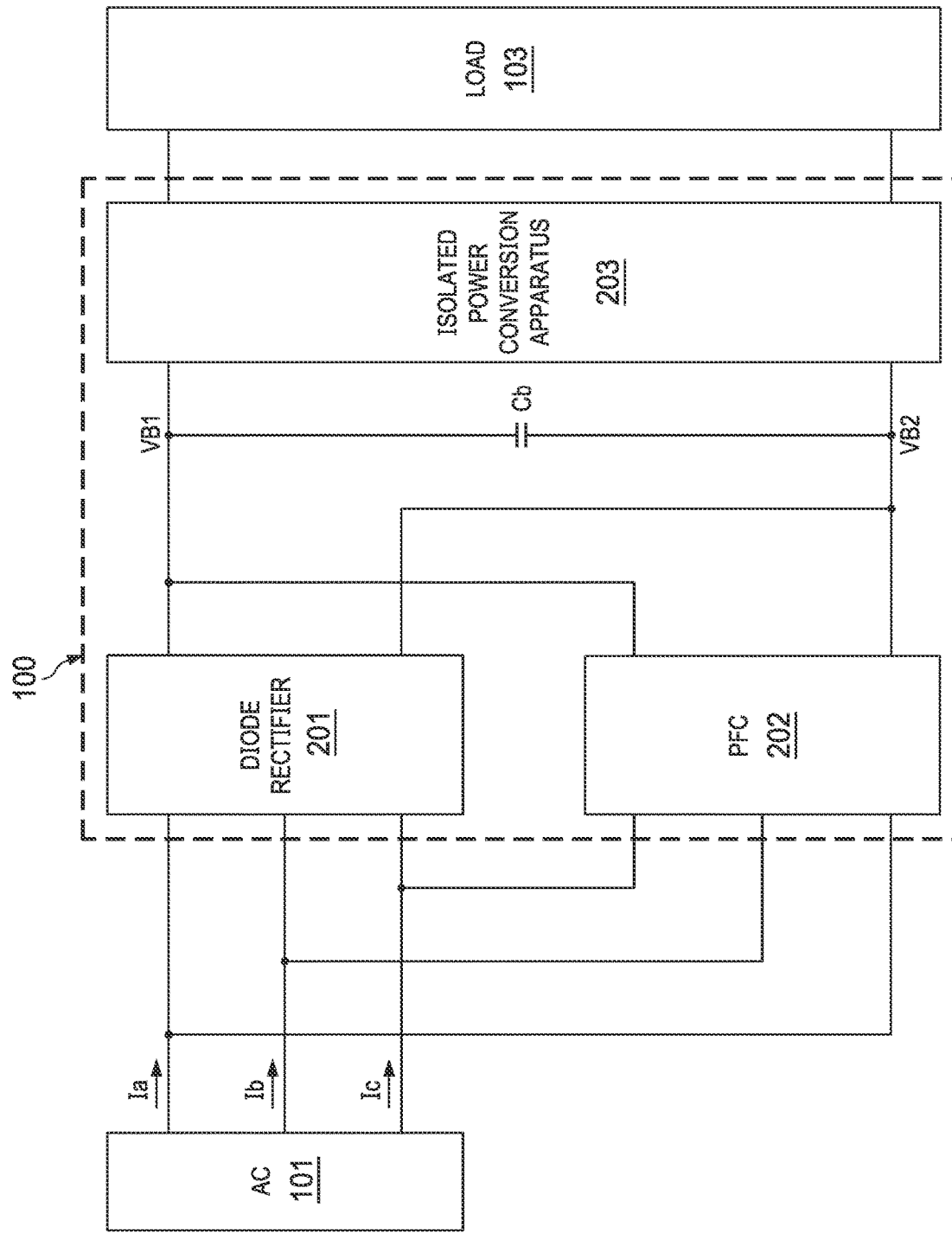
FIG. 2 illustrates a block diagram of an implementation of the power conversion system shown in FIG. 1 in accordance with various embodiments of the present disclosure.

FIG. 2 illustrates a block diagram of an implementation of the power conversion system shown in FIG. 1 in accordance with various embodiments of the present disclosure. The power conversion system 100 comprises the first power conversion apparatus 201 and the second power conversion apparatus 202. As shown in FIG. 2, the first power conversion apparatus 201 is implemented as a diode rectifier. The second power conversion apparatus 202 is implemented as a power factor correction (PFC) device. Throughout the description, the first power conversion apparatus 201 may be alternatively referred to as a diode rectifier. The second power conversion apparatus 202 may be alternatively referred to as a power factor correction device. Furthermore, the first power conversion apparatus 201 may be alternatively referred to as a first rectifier. The second power conversion apparatus 202 may be alternatively referred to as a second rectifier.

As shown in FIG. 2, the diode rectifier 201 and the power factor correction device 202 are connected in parallel between the three-phase AC power source 101 and a capacitor Cb. The power conversions system 100 further comprises the isolated power conversion apparatus 203 connected between the capacitor Cb and the DC load 103.

As shown in FIG. 2, the outputs of the three-phase AC power source 101 has three phases, namely phases a, b and c. The first input of the diode rectifier 201 and the first input of the power factor correction device 202 are connected to phase a (current Ia flows through phase a). The output current Ia of the three-phase AC power source 101 is split into two currents flowing into the diode rectifier 201 and the power factor correction device 202 respectively. Likewise, the output currents Ib and Ic of the three-phase AC power source 110 are split into two currents flowing into the diode rectifier 201 and the power factor correction device 202 respectively. The outputs of the diode rectifier 201 and the outputs of the power factor correction device 202 are connected in parallel and further connected to the isolated power conversion apparatus 203.

As shown in FIG. 2, the capacitor Cb is placed across the input terminals of the isolated power conversion apparatus 203. The capacitor Cb is employed to smooth the output voltage generated by the diode rectifier 201 and the power factor correction device 202. It should be noted that, depending on different applications and design needs, the capacitor Cb may be implemented as a plurality of capacitors connected in series.

In some embodiments, the power conversion system 100 may comprise an electromagnetic interference (EMI) filter connected between the three-phase AC power source 101 and the diode rectifier 201. The EMI filter is employed to reduce high frequency noise that may cause interference with other devices of the power conversion system 100. As a result of employing the EMI filters, the power conversion system 100 may meet various EMI regulations.

The EMI filter may comprise a plurality of passive components including capacitors and inductors. The inductors allow DC or low frequency currents to pass through, while blocking the unwanted high frequency currents. The capacitors provide low impedance paths to divert the unwanted high frequency currents or noise from the EMI filter. The unwanted high frequency currents either go back into the input power source or into ground.

In some embodiments, the EMI filter is designed to attenuate both differential mode noise and common mode noise. The EMI filter may comprise two differential-mode inductors, two common-mode inductors and a plurality of filter capacitors. The two differential-mode inductors along with the plurality of filter capacitors are implemented to filter out differential-mode noise within the power conversion system 100. The two common-mode inductors are utilized to filter out common-mode noise within the power conversion system 100.

It should be noted that the power factor correction device 202 may be implemented as any suitable power factor correction converters such as active boost power factor correction rectifiers, Vienna rectifiers and the like. The detailed schematic diagrams of the power factor correction device 202 and the diode rectifier 201 will be described below with respect to FIGS. 3-4.

In some embodiments, the isolated power conversion apparatus 203 is implemented as a full-bridge LLC power converter. Alternatively, when the capacitor Cb is replaced by two capacitors connected in series, the isolated power conversion apparatus 203 may be implemented as a three-level LLC power converter.

In some embodiments, the isolated power conversion apparatus 203 is configured as a regulated power converter operating at a switching frequency within a range not far away from the resonant frequency of the LLC power converter. In some embodiments, the switching frequency of the switches of the isolated power conversion apparatus 203 may be adjusted within a narrow range (e.g., +/−5% of the resonant frequency of the resonant tank of the LLC power converter). The switching frequency adjustment of the switches of the isolated power conversion apparatus 203 helps to regulate the output voltage of the power conversion system 100. As such, the isolated power conversion apparatus 203 provides a high efficiency power delivery path between the three-phase AC power source 101 and the DC load 103.

It should be noted that implementing the isolated power conversion apparatus 203 as an LLC power converter is merely an example, which should not unduly limit the scope of the claims. One of ordinary skill in the art would recognize many variations, alternatives, and modifications. For example, the isolated power conversion apparatus 203 can be implemented as any suitable isolated power converters such as flyback converters, forward converters, push-pull converters, half-bridge converters, full-bridge converters, any combinations thereof and the like.

In operation, the diode rectifier 201 is configured to operate at an operating frequency equal to the utility frequency (e.g., 60 Hz). The power factor correction device 202 is configured to operating at an operating frequency in a range from about 100 KHz to about 10 MHz. In other words, the operating frequency of the power factor correction device 202 is much higher than that of the diode rectifier 201. The power from the three-phase AC power source 101 to the DC load 103 is not evenly distributed between the diode rectifier 201 and the power factor correction device 202. In some embodiments, the ratio of the power flowing through the diode rectifier 201 to the power flowing through the power factor correction device 202 is equal to 85:15. Since only a fraction of the total power (e.g., 15% of the total power) flows through the power factor correction device 202, the conduction losses as well as the cost of the high frequency inductors and switches of the power factor correction device 202 can be reduced accordingly.

In operation, the input currents of the power factor correction device 202 are adjusted under suitable control schemes such as triangular current mode control so that the power factor of the power conversion system 100 approaches unity (1). Furthermore, under suitable control schemes such as a switching frequency control mechanism, the isolated power conversion apparatus 203 is controlled to have a regulated output voltage applied to the DC load 103.

One advantageous feature of the system configuration described above is the power conversion system 100 is capable of achieving high efficiency as well as a unity power factor. In particular, the diode rectifier 201 may be implemented as an uncontrolled and high-efficiency rectifier operating at the utility frequency. The majority of the power (e.g., 85% of the total power) may flow through the diode rectifier 201. As a result, the power conversion system 100 may achieve high efficiency through the high-efficiency diode rectifier. On the other hand, the power factor correction device 202 is able to help the power conversion system 100 achieve a unity power factor through employing the triangular current mode control.

Figure 3:
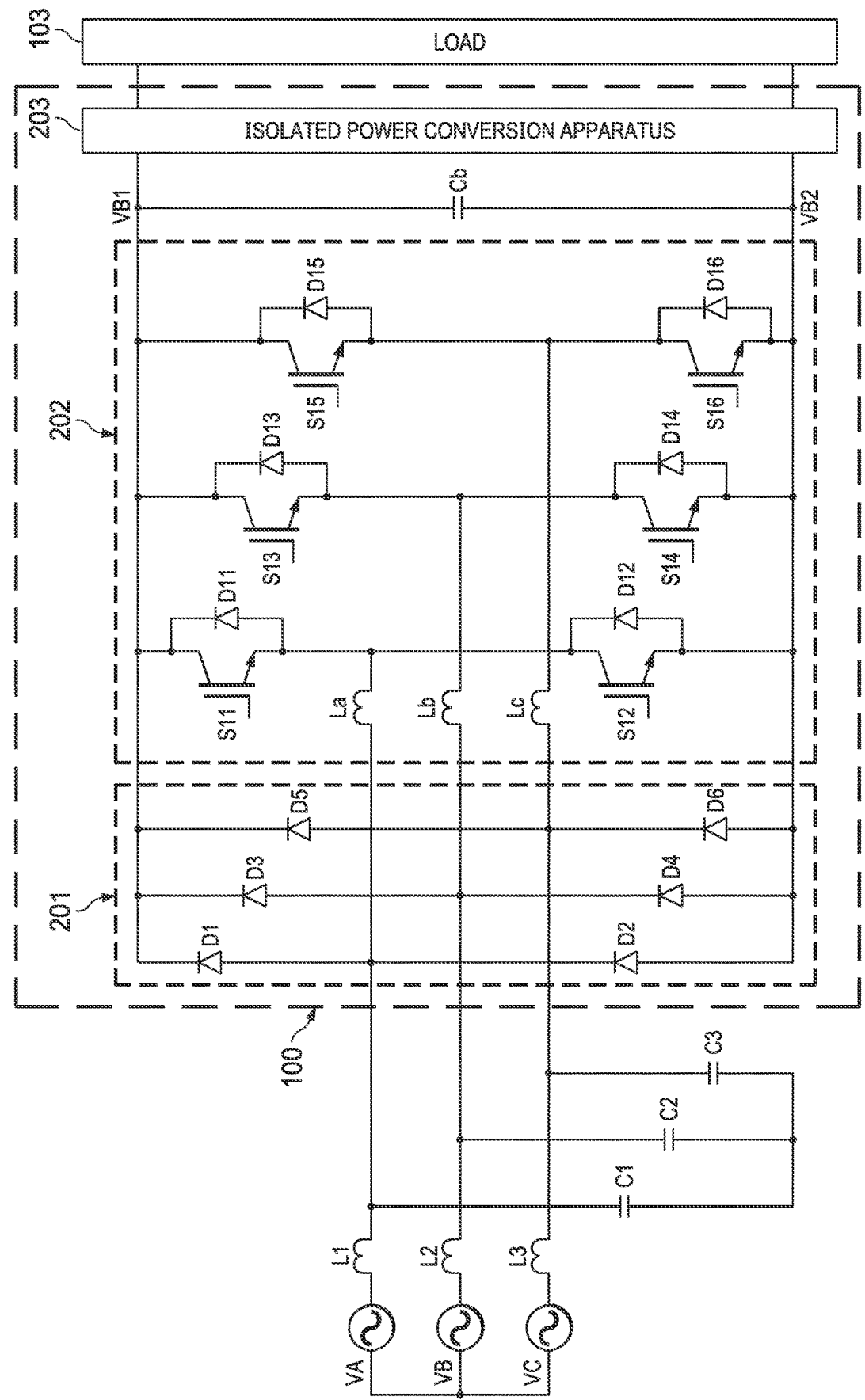
FIG. 3 illustrates a schematic diagram of a first implementation of the power conversion system shown in FIG. 2 in accordance with various embodiments of the present disclosure.

FIG. 3 illustrates a schematic diagram of a first implementation of the power conversion system shown in FIG. 2 in accordance with various embodiments of the present disclosure. The power conversion system comprises an EMI filter, the diode rectifier 201, the power factor correction device 202 and the isolated power conversion apparatus 203.

The diode rectifier 201 converts the AC input waveforms to a pulsating DC waveform. The capacitor Cb is employed to reduce the ripple content of the pulsating DC waveform. The diode rectifier 201 comprises six diodes. The six diodes form three legs. A first leg comprises diodes D1 and D2 connected in series across a first voltage bus VB1 and a second voltage bus VB2. The common node of diodes D1 and D2 is connected to a first phase VA of the three-phase AC source through a first EMI inductor L1.

A second leg of the diode rectifier 201 comprises diodes D3 and D4 connected in series across the first voltage bus VB1 and the second voltage bus VB2. The common node of diodes D3 and D4 is connected to a second phase VB of the three-phase AC source through a second EMI inductor L2. A third leg of the diode rectifier 201 comprises diodes D5 and D6 connected in series across the first voltage bus VB1 and the second voltage bus VB2. The common node of diodes D5 and D6 is connected to a third phase VC of the three-phase AC source through a third EMI inductor L3. The operating principle of the three-phase diode rectifier is well known, and hence is not discussed herein.

The power factor correction device 202 is implemented as a three-phase boost power factor correction converter. The power factor correction device 202 includes three boost converters connected to the three phases of the three-phase AC power source, respectively. A first boost converter comprises a first inductor La, a first switch S11 and a second switch S12. The first switch S11 and the second switch S12 are connected in series across the first voltage bus VB1 and the second voltage bus VB2. The first inductor La is connected between the first EMI inductor L1 and a common node of the first switch S11 and the second switch S12.

A second boost converter comprises a second inductor Lb, a third switch S13 and a fourth switch S14. The third switch S13 and the fourth switch S14 are connected in series across the first voltage bus VB1 and the second voltage bus VB2. The second inductor Lb is connected between the second EMI inductor L2 and a common node of the third switch S13 and the fourth switch S14.

A third boost converter comprises a third inductor Lb, a fifth switch S15 and a sixth switch S16. The fifth switch S15 and the sixth switch S16 are connected in series across the first voltage bus VB1 and the second voltage bus VB2. The third inductor Lc is connected between the third EMI inductor L3 and a common node of the fifth switch S15 and the sixth switch S16.

In operation, a triangular current mode control scheme is applied to the three-phase boost power factor correction converter. In a first half of a cycle of the AC waveform (e.g., the AC waveform from VA), the current flowing through the first inductor La is a positive current triangular in shape. In the second half of the cycle of the AC waveform, the current flowing through the first inductor La is a negative current triangular in shape. In other words, the current flowing through the first inductor La is in phase with the sinusoidal waveform generated by the first phase VA. By employing the triangular current mode control scheme, the three-phase boost power factor correction converter is able to achieve a unity power factor for the power conversion system 100.

In accordance with an embodiment, the switches (e.g., switches S11-S16) may be an insulated gate bipolar transistor (IGBT) device. Alternatively, the switching element can be any controllable switches such as metal oxide semiconductor field effect transistor (MOSFET) devices, integrated gate commutated thyristor (IGCT) devices, gate turn-off thyristor (GTO) devices, silicon controlled rectifier (SCR) devices, junction gate field-effect transistor (JFET) devices, MOS controlled thyristor (MCT) devices, gallium nitride (GaN) based power devices, silicon carbide (SiC) based power devices and/or the like.

It should be noted that when switches S11-S16 are implemented by MOSFET devices, the body diodes of switches S11-S16 can be used to provide a freewheeling channel. On the other hand, when switches S11-S16 are implemented by IGBT devices, a separate freewheeling diode is required to be connected in parallel with its corresponding switch.

As shown in FIG. 3, diodes D11, D12, D13, D14, D15 and D16 are required to provide reverse conducting paths. In other words, diodes D11-D16 are anti-parallel diodes. In some embodiments, diodes D11-D16 are co-packaged with their respective IGBT devices S11-S16. In alternative embodiments, didoes D11-D16 are placed outside their respective IGBT devices S11-S 16.

It should further be noted that while FIG. 3 shows each bidirectional switch is formed by diodes and IGBT devices connected in an anti-parallel arrangement, one of ordinary skill in the art would recognize many variations, alternatives and modifications. For example, the bidirectional switch may be implemented by some new semiconductor switches such as anti-paralleled reverse blocking IGBTs arrangement. The discussion of the IGBT devices herein is applicable to other IGBT devices of this disclosure.

The EMI filter may comprise inductors L1-L3 and capacitors C1-C3. The inductors L1-L3 allow DC or low frequency currents to pass through, while blocking the unwanted high frequency currents. The capacitors C1-C3 provide low impedance paths to divert the unwanted high frequency currents or noise from the EMI filter. The unwanted high frequency currents either go back into the input power source or into ground.

Figure 4:
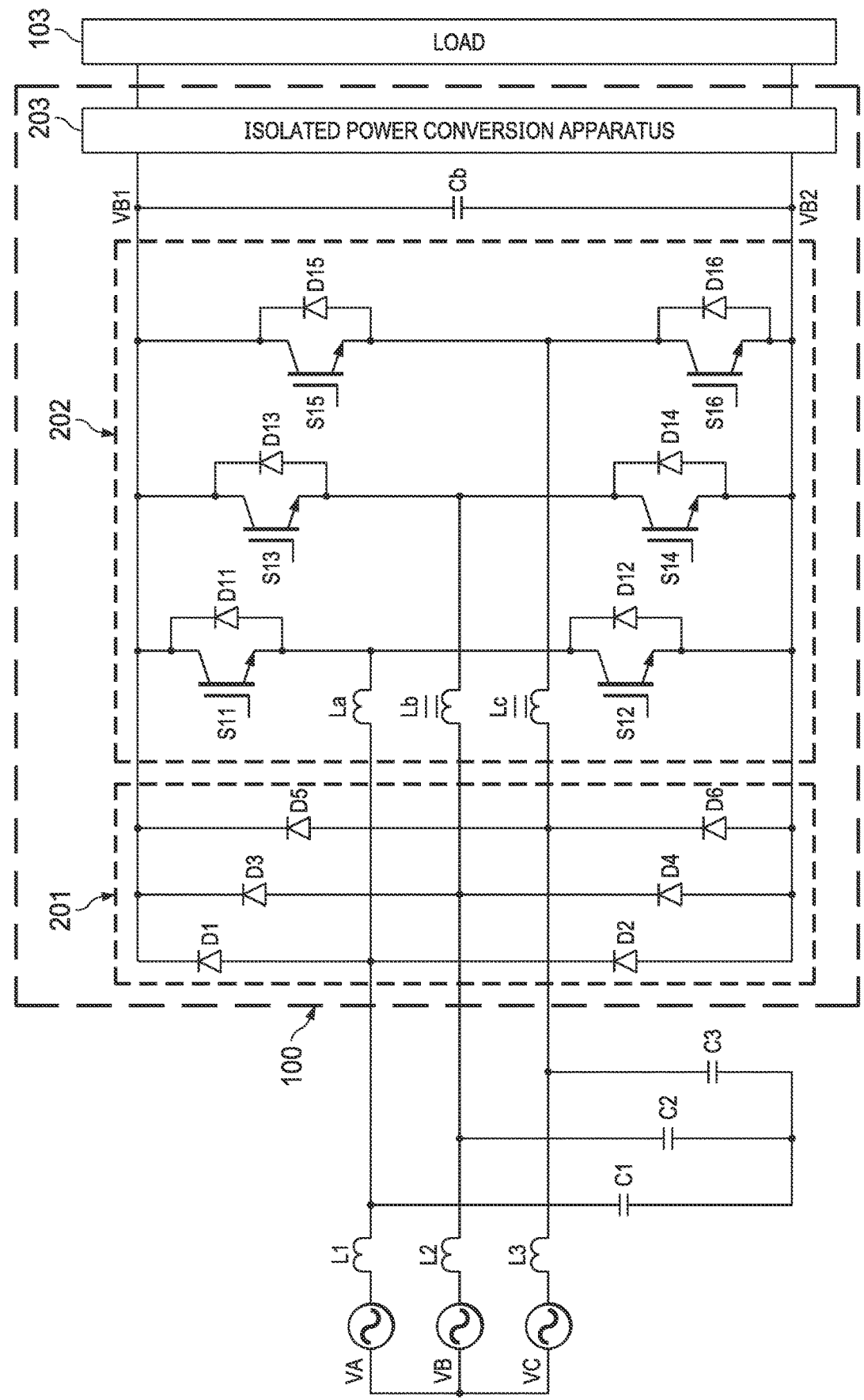
FIG. 4 illustrates a schematic diagram of a second implementation of the power conversion system shown in FIG. 2 in accordance with various embodiments of the present disclosure.

FIG. 4 illustrates a schematic diagram of a second implementation of the power conversion system shown in FIG. 2 in accordance with various embodiments of the present disclosure. The power conversion system shown in FIG. 4 is similar to the power conversion system shown in FIG. 3 except that the inductors La, Lb and Lc of the power factor correction device 202 are magnetically coupled to each other as shown in FIG. 4.

One advantageous feature of having coupled inductors shown in FIG. 4 is that magnetically coupling the three inductors La, Lb and Lc together may help to reduce the current ripple in the power factor correction device 202.

Figure 5:
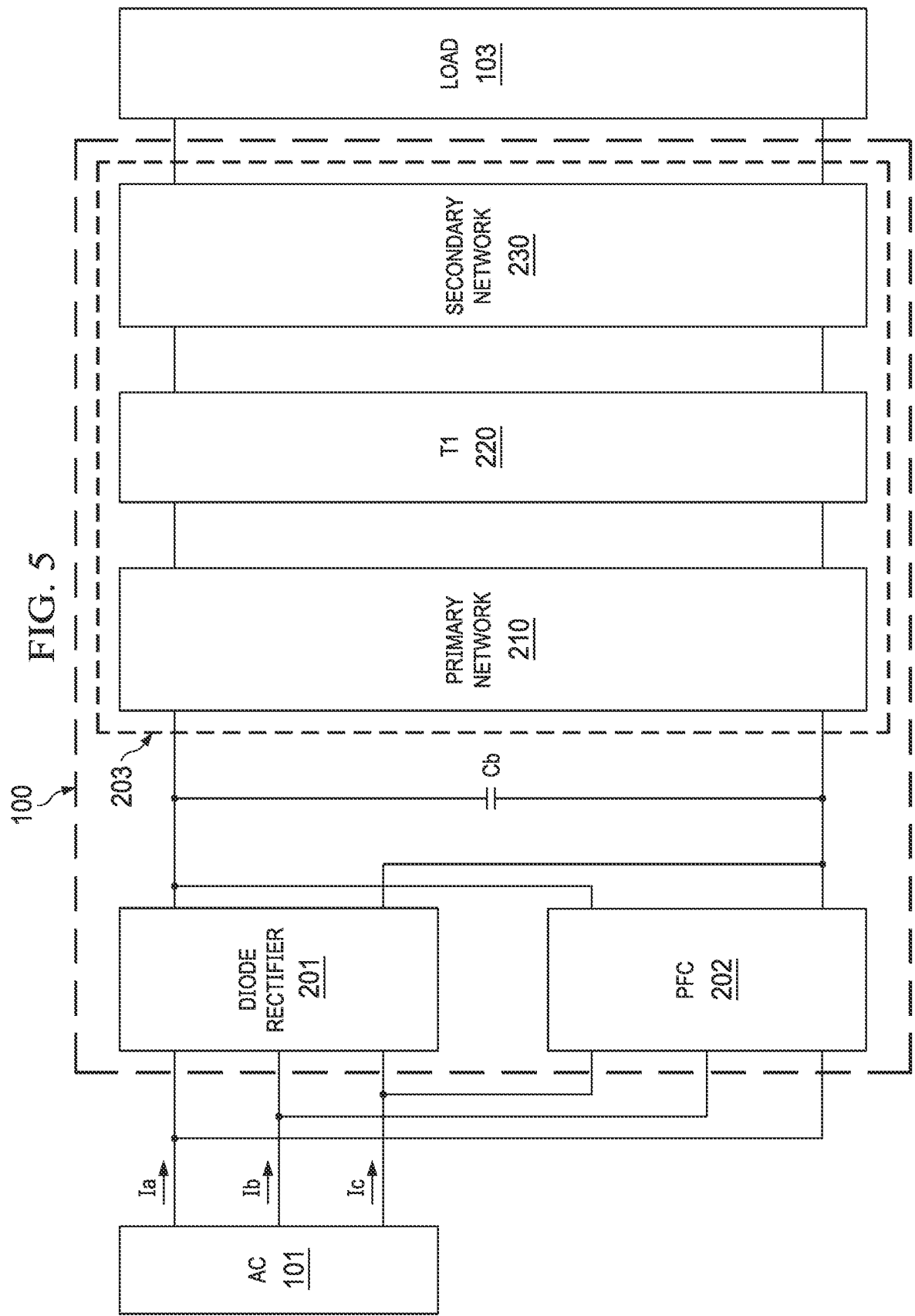
FIG. 5 illustrates a block diagram of the isolated power conversion apparatus of the power conversion system shown in FIG. 2 in accordance with various embodiments of the present disclosure.

FIG. 5 illustrates a block diagram of the isolated power conversion apparatus of the power conversion system shown in FIG. 2 in accordance with various embodiments of the present disclosure. As shown in FIG. 5, the isolated power conversion apparatus 203 comprises a primary network 210, a transformer 220 and a secondary network 230 connected in cascade between the capacitor Cb and the DC load 103.

The primary network 210 comprises a plurality of switches and a resonant tank. In some embodiments, the switching frequency of the plurality of switches of the primary network 210 is equal to the resonant frequency of the resonant tank. Alternatively, depending on design needs and different application, the switching frequency of the plurality of switches may vary in a narrow range to help the isolated power conversion apparatus 203 regulate the output voltage of the power conversion system 100. The detailed schematic diagram of the primary network 210 of the isolated power conversion apparatus 203 will be described below with respect to FIGS. 6-8.

The transformer 220 provides electrical isolation between the primary side and the secondary side of the isolated power conversion apparatus 203. In accordance with an embodiment, the transformer 220 may be formed of two transformer windings, namely a primary transformer winding and a secondary transformer winding. Alternatively, the transformer 220 may have a center tapped secondary so as to have three transformer windings including a primary transformer winding, a first secondary transformer winding and a second secondary transformer winding.

It should be noted that the transformers illustrated herein and throughout the description are merely examples, which should not unduly limit the scope of the claims. One of ordinary skill in the art would recognize many variations, alternatives, and modifications. For example, the transformer 220 may further comprise a variety of bias windings and gate drive auxiliary windings.

The secondary network 230 converts an alternating polarity waveform received from the output of the transformer 220 to a single polarity waveform applied to the DC load 103. The secondary network 230 may be formed of two pairs of switching elements such as n-type metal oxide semiconductor (NMOS) transistors. Alternatively, the secondary network 230 may be formed of two pairs of diodes. Furthermore, the secondary network 230 may be formed by other types of controllable devices such as metal oxide semiconductor field effect transistor (MOSFET) devices, bipolar junction transistor (BJT) devices, super junction transistor (SJT) devices, insulated gate bipolar transistor (IGBT) devices and the like. The detailed schematic diagram of the secondary network 230 of the isolated power conversion apparatus 203 will be described below with respect to FIGS. 6-8.

Figure 6A:
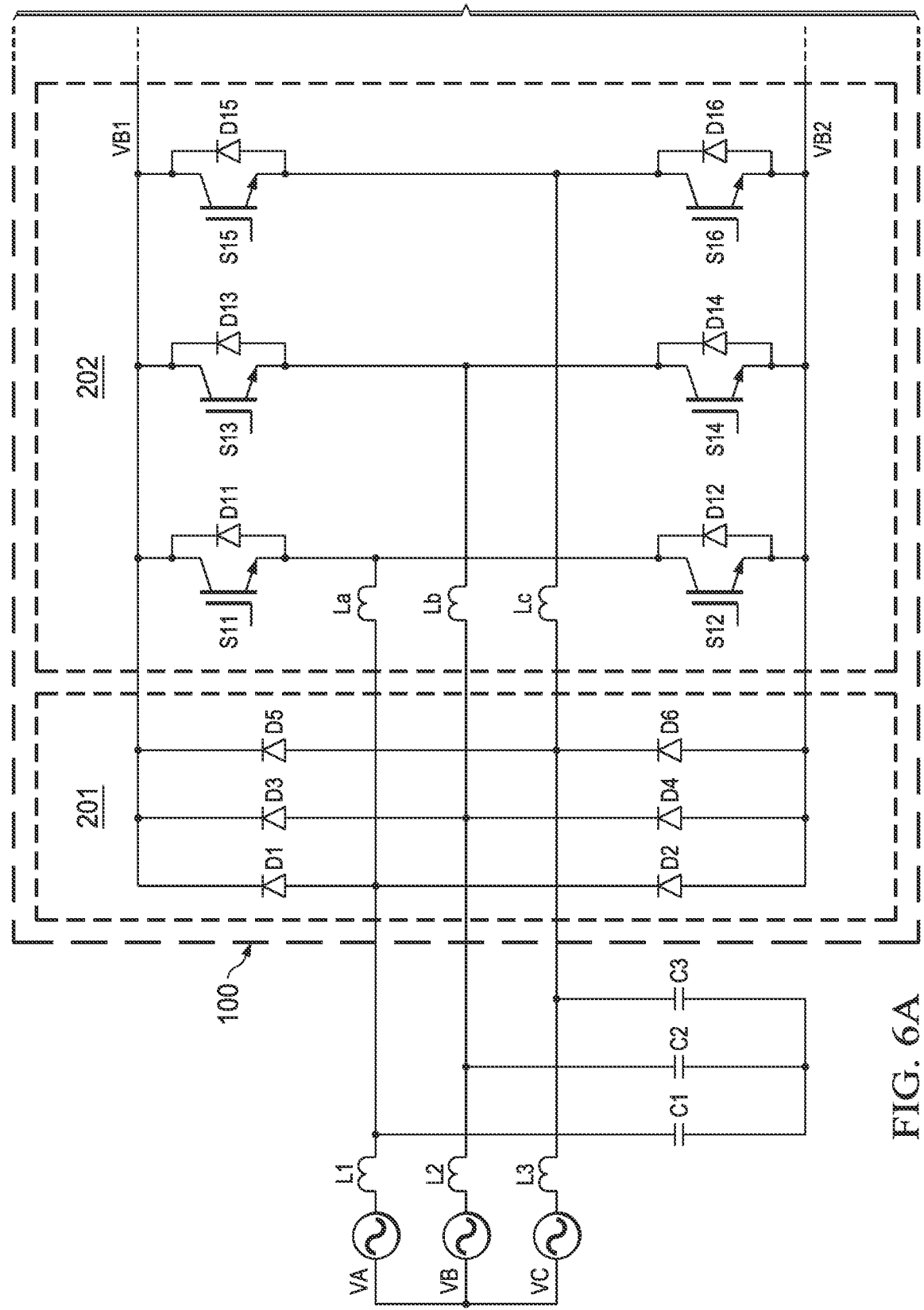
FIG. 6A and FIG. 6B are collectively referred to as FIG. 6 throughout the description.
Figure 6B:
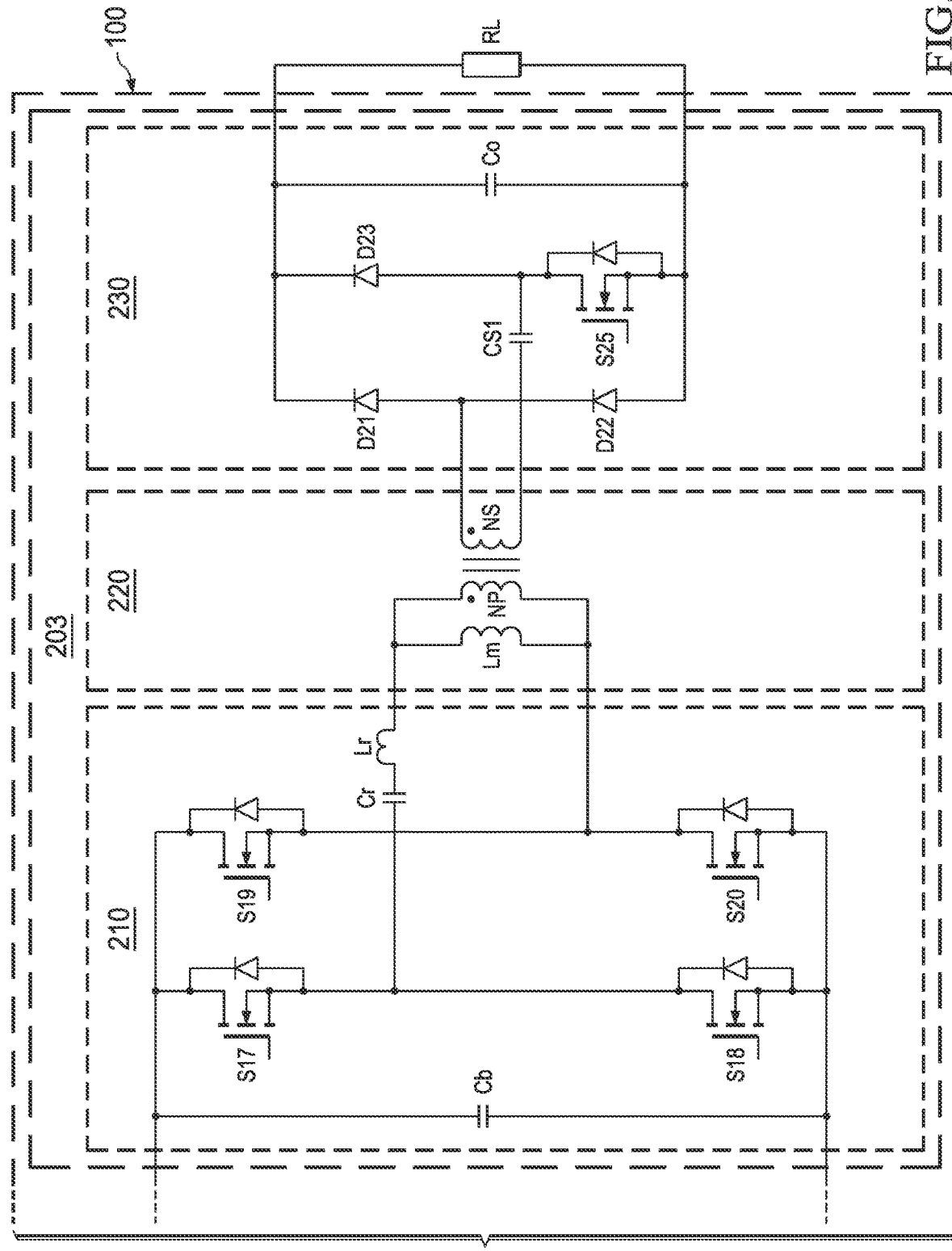

FIG. 6 illustrates a schematic diagram of a first implementation of the isolated power conversion apparatus in accordance with various embodiments of the present disclosure. The isolated power conversion apparatus 203 is implemented as an LLC power converter as shown in FIG. 6. The DC load is represented by RL, which may be a battery, a downstream converter, a resistor, any combinations thereof and the like. Throughout the description, the isolated power conversion apparatus 203 may be alternatively referred to as an LLC power converter.

As shown in FIG. 6, the LLC power converter 203 comprises the primary network 210 comprising a switch network and a resonant tank, the transformer 220 and the secondary network 230. As shown in FIG. 6, the switch network, the resonant tank, the transformer 220 and the secondary network 230 are connected in cascade between the voltage buses VB1, VB2 and the DC load RL.

The switch network comprises two switch legs. A first switch leg comprises switches S17 and S18 connected in series between the first voltage bus VB1 and the second voltage bus VB2. A second switch leg comprises switches S19 and S20 connected in series between the first voltage bus VB1 and the second voltage bus VB2. The common node of switches S17 and S18 is connected to a first terminal of the primary winding NP through the resonant tank. The common node of switches S19 and S20 is connected to a second terminal of the primary winding NP of the transformer 220.

The resonant tank may be implemented in a variety of ways. For example, the resonant tank comprises a series resonant inductor Lr, a parallel resonant inductor Lm and a series resonant capacitor Cr as shown in FIG. 6.

The series resonant inductor and the parallel resonant inductor may be implemented as external inductors. A person skilled in the art will recognize that there may be many variations, alternatives and modifications. For example, the series resonant inductor may be implemented as a leakage inductance of the transformer 220.

In sum, the resonant tank includes three key resonant elements, namely the series resonant inductor, the series resonant capacitor and the parallel resonant inductor. Such a configuration is commonly referred to as an LLC resonant converter. According to the operating principle of LLC resonant converters, at a switching frequency approximately equal to the resonant frequency of the resonant tank, the resonant tank helps to achieve zero voltage switching for the primary side switching elements and zero current switching for the secondary side switching elements.

The transformer 220 may be formed of two transformer windings, namely a primary transformer winding NP and a secondary transformer winding NS as shown in FIG. 6. Alternatively, the transformer 220 may have a center tapped secondary so as to have three transformer windings including a primary transformer winding, a first secondary transformer winding and a second secondary transformer winding.

The secondary network 230 is implemented as a secondary rectifier converting an alternating polarity waveform received from the output of the transformer 220 to a single polarity waveform. The secondary network 230 comprises switch S25 and diodes D21-D23. As shown in FIG. 6, the diodes D21 and D22 are connected in series across the two terminals of the output capacitor Co. Likewise, the diode D23 and the switch S25 are connected in series across the two terminals of the output capacitor Co. The common node of the diodes D21 and D22 is connected to a first terminal of the secondary winding NS. The common node of the diode D23 and the switch S25 is connected to a second terminal of the secondary winding NS through a secondary capacitor CS1.

The secondary capacitor CS1 is employed to achieve a voltage doubler function. For example, when the switch S25 is configured as an always-on switch, the secondary network 230 is configured as a voltage doubler. More particularly, the secondary network 230 charges the secondary capacitor CS from the input voltage generated by the secondary winding NS. The input voltage and the voltage across the secondary capacitor CS1 are added together. As a result having the input voltage and the voltage across the secondary capacitor CS added together, the output voltage of the secondary network 230 is about twice the input voltage. Throughout the description, configuring a switch as an always-on switch may be alternatively referred to as fixing a switch in an always-on state.

Figure 7A:
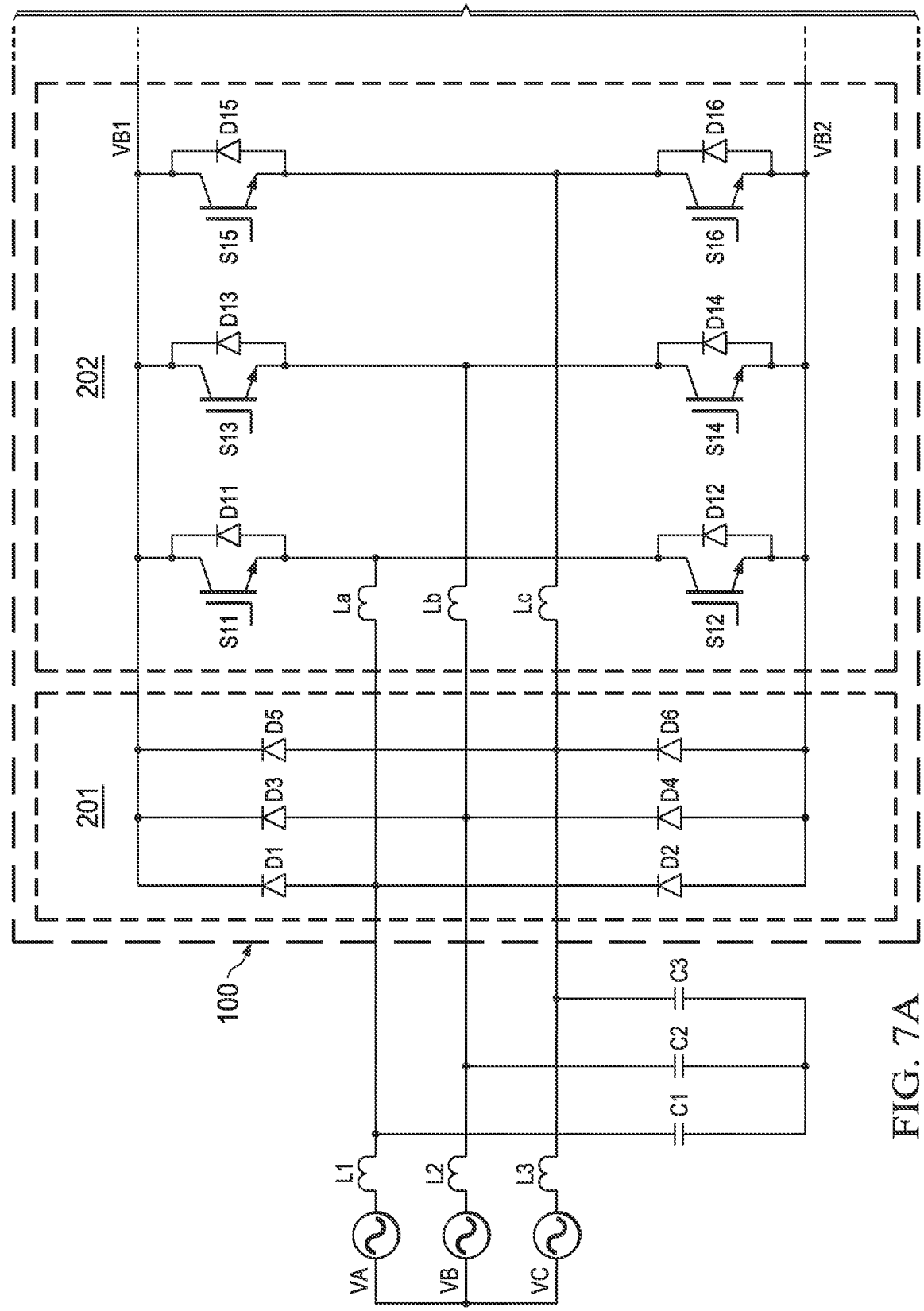
FIG. 7A and FIG. 7B are collectively referred to as FIG. 7 throughout the description.
Figure 7B:
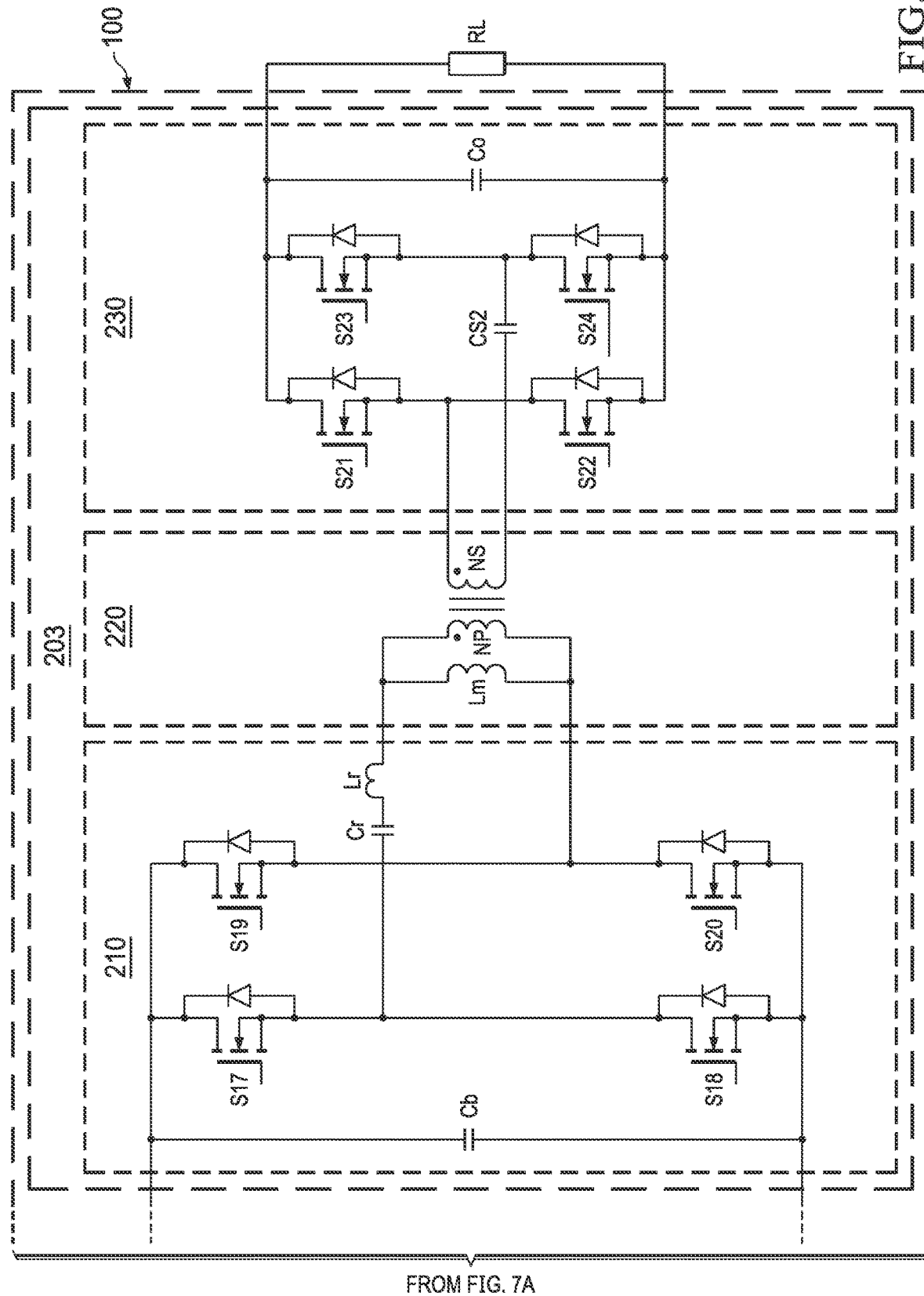

FIG. 7 illustrates a schematic diagram of a second implementation of the isolated power conversion apparatus in accordance with various embodiments of the present disclosure. The LLC power converter 203 shown in FIG. 7 is similar to that shown in FIG. 6 except that the diodes of the secondary network 230 have been replaced by respective switches S21-S23. In operation, the gates of the switches S21-S23 are controlled so that the switches S21-S23 emulate the operation of the respective diodes shown in FIG. 6. One advantageous feature of having the LLC power converter 203 shown in FIG. 7 is the switches S21-S23 can help to save the conduction losses caused by the forward voltage drop of the diodes.

Figure 8A:
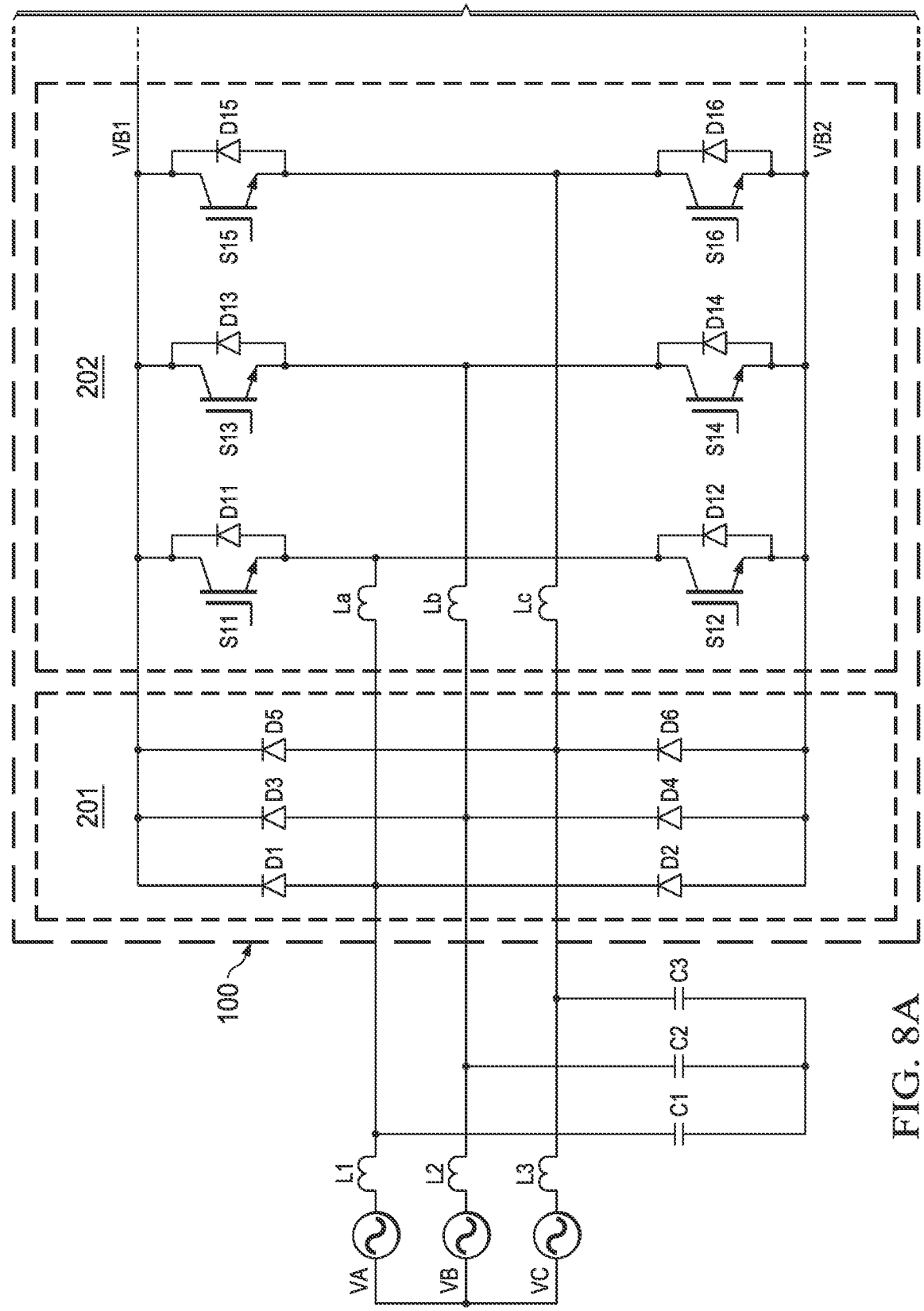
FIG. 8A and FIG. 8B are collectively referred to as FIG. 8 throughout the description.
Figure 8B:
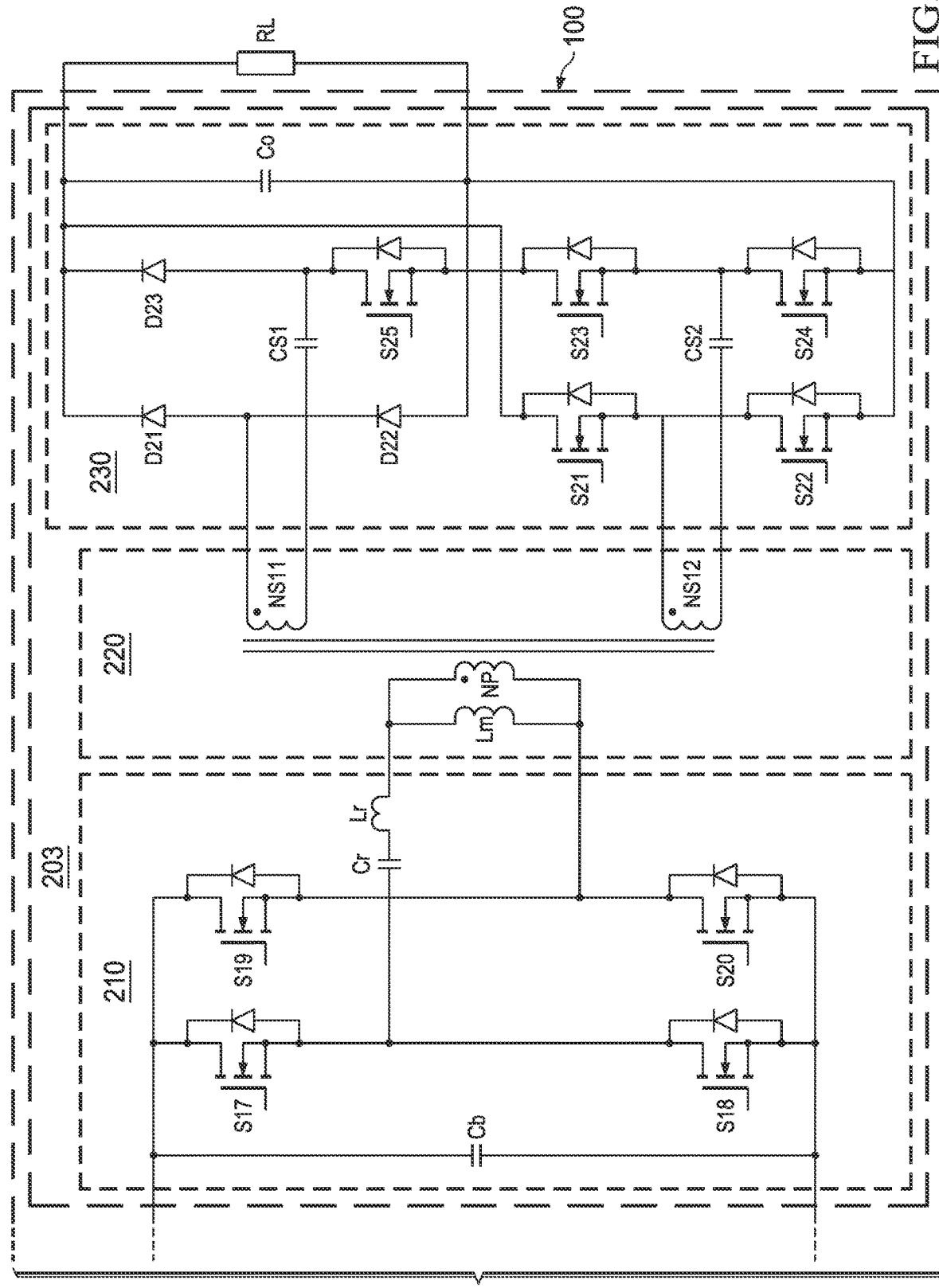

FIG. 8 illustrates a schematic diagram of a third implementation of the isolated power conversion apparatus in accordance with various embodiments of the present disclosure. The LLC power converter 203 shown in FIG. 8 is similar to that shown in FIG. 6 except that the transformer 220 includes two secondary windings, and the secondary network 230 shown in FIG. 8 comprises two rectifier circuits.

The transformer 220 may be formed of three transformer windings, namely a primary transformer winding NP and two secondary transformer windings NS11 and NS12 as shown in FIG. 8. The secondary network 230 comprises a first secondary rectifier and a second secondary rectifier having their outputs connected in parallel. As shown in FIG. 8, the first secondary rectifier (D21-D23 and S25) is connected between the first secondary winding NS11 and the output capacitor Co. The operating principle of the first secondary rectifier is similar to that of the secondary network described above with respect to FIG. 6, and hence is not discussed herein. The second secondary rectifier (S21-S24) is connected between the second secondary winding NS12 and the output capacitor Co. The operating principle of the second secondary rectifier is similar to that of the secondary network described above with respect to FIG. 7, and hence is not discussed herein.

The secondary capacitors CS1 and CS2 shown in FIG. 8 are employed to achieve a voltage doubler function. It should be noted when the first secondary rectifier is configured as voltage doubler, the second secondary rectifier should be configured as a voltage doubler too. In other words, the switch S24 is configured as an always-on switch when the switch S25 is configured as an always-on switch.

Figure 9:
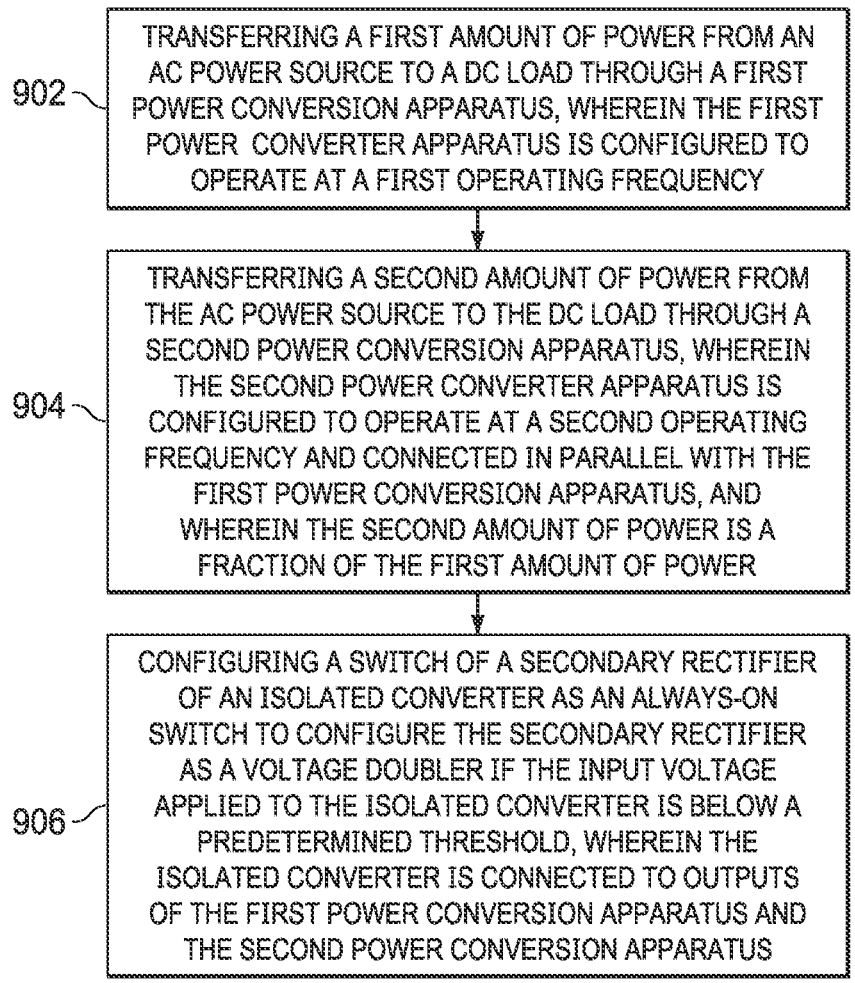
FIG. 9 illustrates a flow chart of a method for controlling the power conversion system shown in FIG. 1 in accordance with various embodiments of the present disclosure.

FIG. 9 illustrates a flow chart of a method for controlling the power conversion system shown in FIG. 1 in accordance with various embodiments of the present disclosure. This flowchart shown in FIG. 9 is merely an example, which should not unduly limit the scope of the claims. One of ordinary skill in the art would recognize many variations, alternatives, and modifications. For example, various steps illustrated in FIG. 9 may be added, removed, replaced, rearranged and repeated.

A power conversion system comprises a diode rectifier, a power factor correction device and an isolated power converter connected between an AC power source and a DC load. The diode rectifier and the power factor correction device are connected in parallel between the AC power source and the isolated power converter. When the power conversion system is configured as an AC/DC power conversion system, the power from the AC power source is delivered to the isolated power converter through two different routes. In other words, the power goes partially through the diode rectifier and partially through the power factor correction device. The power through the diode rectifier is greater than the power through the power factor correction device.

The diode rectifier is an uncontrolled power conversion apparatus operating the utility frequency. The power factor correction device operates at a switching frequency much higher than the utility frequency. The power factor correction device is controlled by a triangular current mode control scheme. Under the triangular current mode control scheme, the power factor correction device is able to achieve a unity power factor for the power conversion system.

The isolated power converter is implemented as an LLC power converter. The secondary rectifier of the LLC power converter may be configured as a voltage doubler depending on different applications and design needs.

At step 902, a first amount of power is transferred from the AC power source to the DC load through a first power conversion apparatus, which is implemented as a diode rectifier operating at a first operating frequency such as the utility frequency (60 Hz).

At step 904, a second amount of power is transferred from the AC power source to the DC load through a second power conversion apparatus. The second power conversion apparatus is implemented as a power factor correction device. The power factor correction device is configured to operate at a second operating frequency, which is much higher than the first operating frequency. The power factor correction device and the diode rectifier are connected in parallel between the AC power source and the isolated power converter. The second amount of power is a fraction of the first amount of power. For example, the second amount of power is about 15% of the total power transferred from the AC power source to the DC load. The first amount of power is about 85% of the total power transferred from the AC power source to the DC load.

At step 906, a switch of a secondary rectifier of the isolated converter is configured as an always-on switch if the input voltage applied to the isolated converter is below a predetermined threshold. As a result of having the switch as an always-on switch, the secondary rectifier of the isolated converter is configured as a voltage doubler.

Although embodiments of the present disclosure and its advantages have been described in detail, it should be understood that various changes, substitutions and alterations can be made herein without departing from the spirit and scope of the disclosure as defined by the appended claims.

Moreover, the scope of the present application is not intended to be limited to the particular embodiments of the process, machine, manufacture, composition of matter, means, methods and steps described in the specification. As one of ordinary skill in the art will readily appreciate the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. The specification and drawings are, accordingly, to be regarded simply as an illustration of the disclosure as defined by the appended claims, and are contemplated to cover any and all modifications, variations, combinations or equivalents that fall within the scope of the present disclosure.

What is claimed is:

1. A system comprising:
    a first rectifier coupled to a three-phase power source and configured to operate at a first operating frequency, a first amount of power flowing through the first rectifier from the three-phase power source;
    a second rectifier coupled to the three-phase power source and configured to operate at a second operating frequency that is higher than the first operating frequency, a second amount of power flowing through the second rectifier from the three-phase power source, the second amount of power being a fraction of the first amount of power; and
    an isolated power converter connected to outputs of the first rectifier and the second rectifier.

2. The system of claim 1, wherein the first rectifier is a three-phase diode rectifier, and the second rectifier is a three-phase power factor correction converter.

3. The system of claim 2, wherein the three-phase power factor correction converter is a triangular current mode power factor correction converter comprising:
    a first inductor connected between a first phase of the three-phase power source and a first switch leg;
    a second inductor connected between a second phase of the three-phase power source and a second switch leg; and
    a third inductor connected between a third phase of the three-phase power source and a third switch leg, and wherein the first switch leg, the second switch leg and the third switch leg are connected between a first output terminal of the three-phase diode rectifier and a second output terminal of the three-phase diode rectifier.

4. The system of claim 3, wherein the first inductor, the second inductor and the third inductor are magnetically coupled to each other.

5. The system of claim 3, further comprising:
    an electromagnetic interference (EMI) filter connected between the three-phase power source and the three-phase diode rectifier.

6. The system of claim 3,
wherein the isolated power converter is connected to output terminals of the three-phase diode rectifier, and wherein the isolated power converter comprises a primary network, a transformer and a secondary network, and wherein the primary network is a full-bridge inductor-inductor-capacitor (LLC) converter.

7. The system of claim 6, wherein the secondary network comprises:
   a first diode and a second diode connected in series with one another, a common node of the first diode and the second diode connected to a first terminal of a secondary winding of the transformer; and
   a third diode and a fifth switch connected in series with one another, a common node of the third diode and the fifth switch connected to a second terminal of the secondary winding of the transformer through a secondary capacitor, wherein the secondary network is configured as a voltage doubler through fixing the fifth switch in an always-on state.

8. The system of claim 6, wherein the secondary network comprises:
   a first switch and a second switch connected in series with one another, a common node of the first switch and the second switch connected to a first terminal of a secondary winding of the transformer; and
   a third switch and a fourth switch connected in series with one another, a common node of the third switch and the fourth switch connected to a second terminal of the secondary winding of the transformer through a secondary capacitor, wherein the secondary network is configured as a voltage doubler through fixing the fourth switch in an always-on state.

9. The system of claim 6, wherein the secondary network comprises:
   a first secondary rectifier comprises:
      a first diode and a second diode connected in series with one another, a common node of the first diode and the second diode connected to a first terminal of a first secondary winding of the transformer; and
      a third diode and a fifth switch connected in series with one another, a common node of the third diode and the fifth switch connected to a second terminal of the first secondary winding of the transformer through a first secondary capacitor; and
   a second secondary rectifier comprises:
      a first switch and a second switch connected in series with one another, a common node of the first switch and the second switch connected to a first terminal of a second secondary winding of the transformer; and
      a third switch and a fourth switch connected in series with one another, a common node of the third switch and the fourth switch connected to a second terminal of the second secondary winding of the transformer through a second secondary capacitor.

10. The system of claim 9, wherein the first secondary rectifier and the second secondary rectifier are configured as a first voltage doubler and a second voltage doubler, respectively through fixing both of the fourth switch and the fifth switch in an always-on state.

11. The system of claim 1, wherein the second rectifier is formed by six insulated gate bipolar transistor (IGBT) devices.

12. A method comprising:
   detecting an input voltage applied to an isolated power converter connected to outputs of a first power conversion device and a second power conversion device;
   transferring a first amount of power from an alternating current (AC) power source to a direct current (DC) load through the first power conversion device configured to operate at a first operating frequency; and
   transferring a second amount of power from the AC power source to the DC load through the second power conversion device configured to operate at a second operating frequency that is higher than the first operating frequency, the second amount of power being a fraction of the first amount of power.

13. The method of claim 12, further comprising:
   configuring a switch of a secondary rectifier of the isolated power converter as an always-on switch to configure the secondary rectifier as a voltage doubler if the input voltage applied to the isolated power converter is below a predetermined threshold.

14. The method of claim 13, wherein the isolated power converter comprises a primary network, a transformer, and the secondary rectifier connected in cascade with one another, and wherein the primary network is a full-bridge inductor-inductor-capacitor (LLC) converter, and the secondary rectifier comprises:
   a first diode and a second diode connected in series with one another, a common node of the first diode and the second diode connected to a first terminal of a secondary winding of the transformer; and
   a third diode and the switch connected in series with one another, a common node of the third diode and the switch connected to a second terminal of the secondary winding of the transformer through a secondary capacitor.

15. The method of claim 12, further comprising:
   configuring the second power conversion device to operate in a triangular current mode to achieve a unity power factor.

16. The method of claim 12, wherein the first power conversion device is a three-phase diode rectifier, and the second power conversion device is a three-phase power factor correction device.

17. A system comprising:
   a first power conversion device connected between a three-phase power source and a DC voltage bus and configured to operate at a first operating frequency, a first amount of power flowing from the three-phase power source to the DC voltage bus through the first power conversion device;
   a second power conversion device connected between the three-phase power source and the DC voltage bus and configured to operate at a second operating frequency that is higher than the first operating frequency, a second amount of power flowing from the three-phase power source to the DC voltage bus through the second power conversion device, the second amount of power being a fraction of the first amount of power; and
   an isolated power converter connected to the DC voltage bus, the isolated power converter further connected to outputs of the first power conversion device and the second power conversion device.

18. The system of claim 17, wherein the first power conversion device is a three-phase diode rectifier, and the second power conversion device is a three-phase power factor correction converter.

19. The system of claim 17, wherein the isolated power converter is an inductor-inductor-capacitor (LLC) power converter comprising a primary network, a transformer, and a secondary network connected in cascade with one another.

20. The system of claim 19, wherein the secondary network comprises a first secondary rectifier and a second secondary rectifier having outputs connected in parallel, and wherein:
- the first secondary rectifier comprises:
    - a first diode and a second diode connected in series with one another, a common node of the first diode and the second diode connected to a first terminal of a first secondary winding of the transformer; and
    - a third diode and a fifth switch connected in series with one another, a common node of the third diode and the fifth switch connected to a second terminal of the first secondary winding of the transformer through a first secondary capacitor; and
- the second secondary rectifier comprises:
    - a first switch and a second switch connected in series with one another, a common node of the first switch and the second switch connected to a first terminal of a second secondary winding of the transformer; and
    - a third switch and a fourth switch connected in series with one another, a common node of the third switch and the fourth switch connected to a second terminal of the second secondary winding of the transformer through a second secondary capacitor.

\* \* \* \* \*